United States Patent
Dholakia (12)

(10) Patent No.: US 10,053,372 B1
(45) Date of Patent: Aug. 21, 2018

(54) METHOD AND APPARATUS FOR FILTERING STORMWATER

(71) Applicant: Jayant M. Dholakia, Chandler, AZ (US)

(72) Inventor: Jayant M. Dholakia, Chandler, AZ (US)

(*) Notice: Subject to any disclaimer, the term of this patent is extended or adjusted under 35 U.S.C. 154(b) by 247 days.

(21) Appl. No.: 14/545,417

(22) Filed: Apr. 28, 2015

Related U.S. Application Data

(63) Continuation-in-part of application No. 13/373,566, filed on Nov. 19, 2011.

(51) Int. Cl.
*C02F 1/00* (2006.01)
*E03F 1/00* (2006.01)
*B01D 24/00* (2006.01)

(52) U.S. Cl.
CPC .............. *C02F 1/004* (2013.01); *E03F 1/00* (2013.01); *B01D 24/001* (2013.01); *B01D 24/004* (2013.01)

(58) Field of Classification Search
None
See application file for complete search history.

(56) References Cited

U.S. PATENT DOCUMENTS

| | | | |
|---|---|---|---|
| 1,858,357 A * | 5/1932 | Coe | B01D 24/22 210/285 |
| 3,044,628 A | 7/1962 | Heijnis | |
| 3,875,055 A | 4/1975 | Grosboll | |
| 3,876,546 A | 4/1975 | Hsiung | |
| 4,235,724 A | 11/1980 | Ginaven | |
| 5,024,771 A | 6/1991 | Chiarito | |
| 5,281,332 A | 1/1994 | Vandervelde | |
| 5,474,586 A | 12/1995 | Eaton | |
| 5,492,635 A | 2/1996 | Ball | |
| 5,707,527 A | 1/1998 | Knutson | |
| 6,337,025 B1 | 1/2002 | Clemenson | |
| 6,533,941 B2 | 3/2003 | Butler | |
| 6,649,048 B2 | 11/2003 | de Ridder | |
| 7,045,067 B2 | 5/2006 | Brown | |
| 7,163,630 B2 | 1/2007 | Chilcote | |
| 7,419,591 B2 | 9/2008 | Aberle | |

* cited by examiner

*Primary Examiner* — Benjamin M Kurtz

(57) ABSTRACT

A device and method for increasing the area available for passing contaminated stormwater through a granular media. The device comprises of one or more elements of predetermined size and shape. The increased area available for flow is obtained by introducing a first media into predetermined areas of the device, introducing a second media into predetermined areas of the device, and bringing into contact the first and second media.

14 Claims, 7 Drawing Sheets

Figure 4:
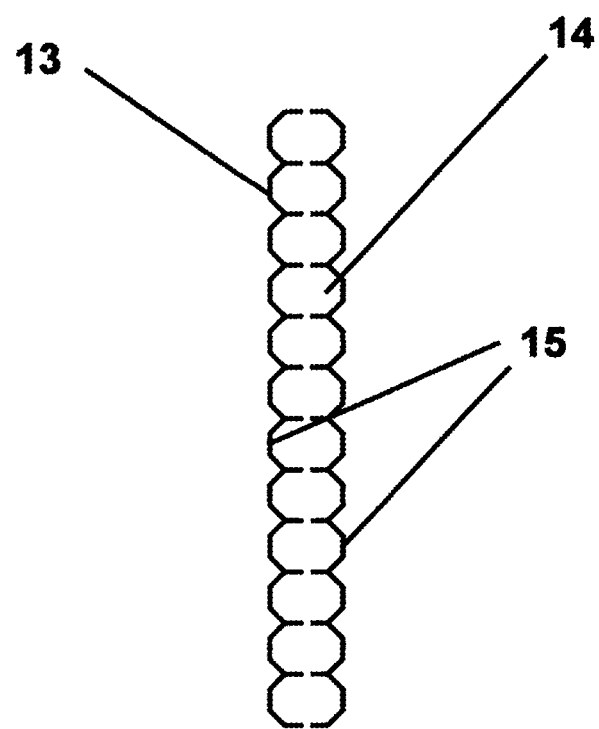

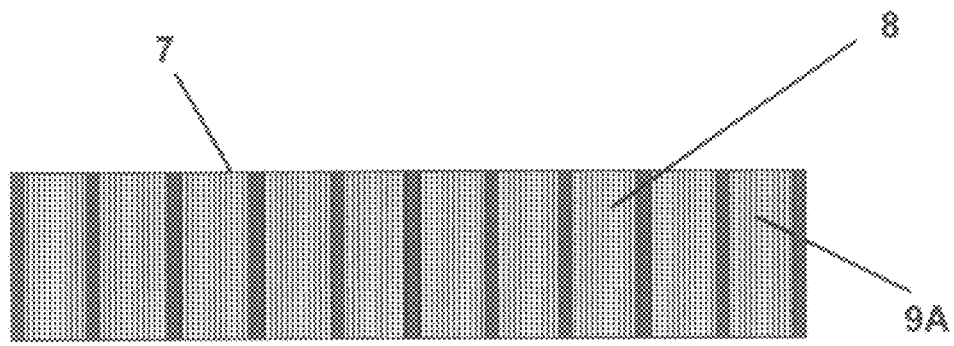
Fig. 1-A
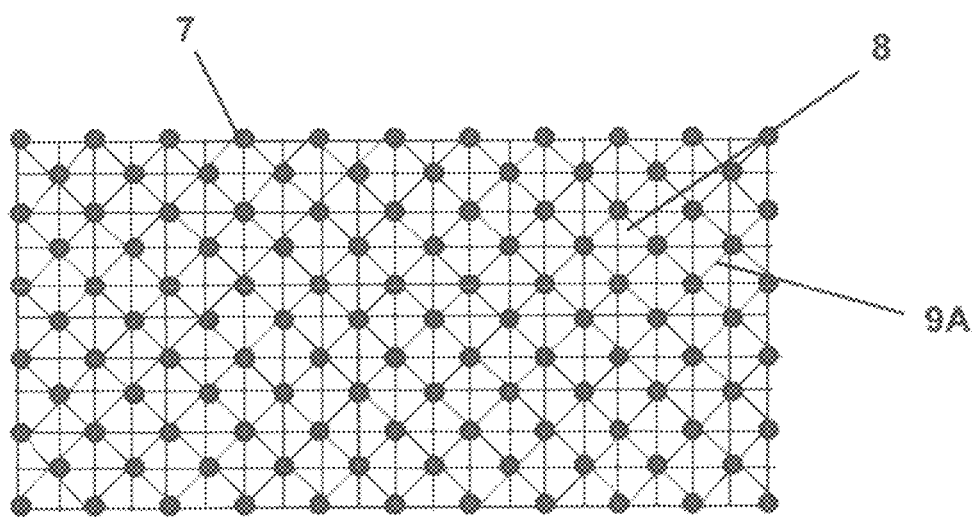
Fig. 1-B

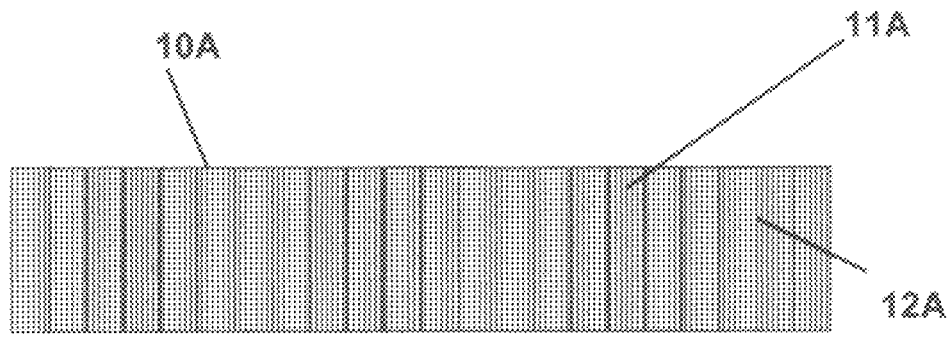
Fig. 2-A
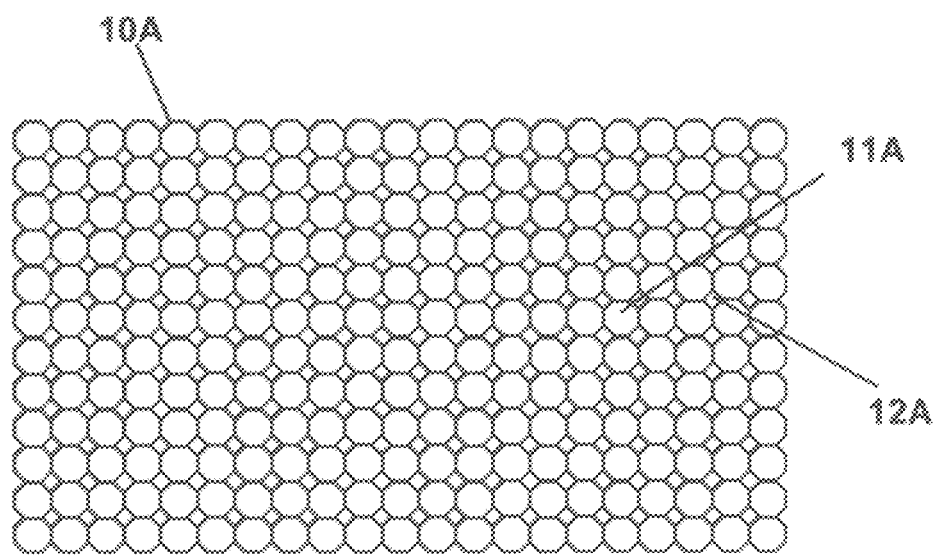
Fig. 2-B

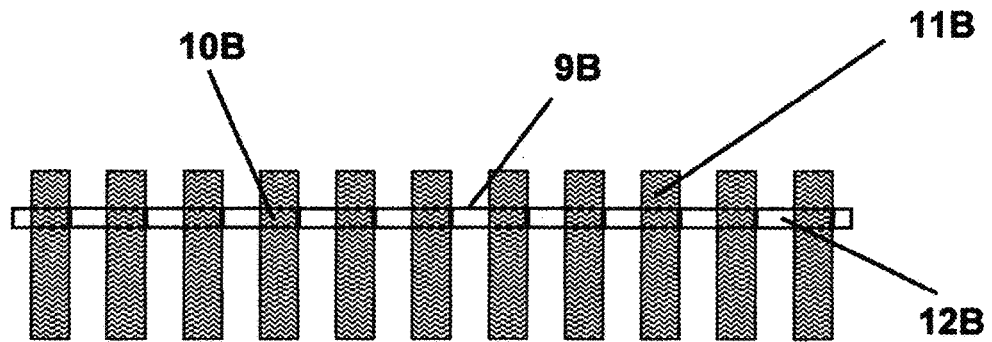
Fig. 3-A
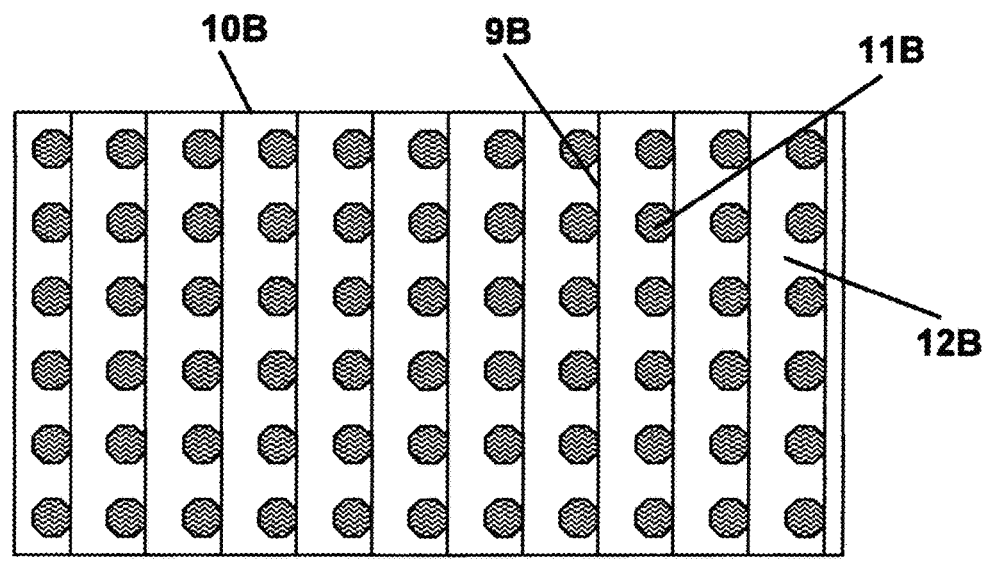
Fig. 3-B

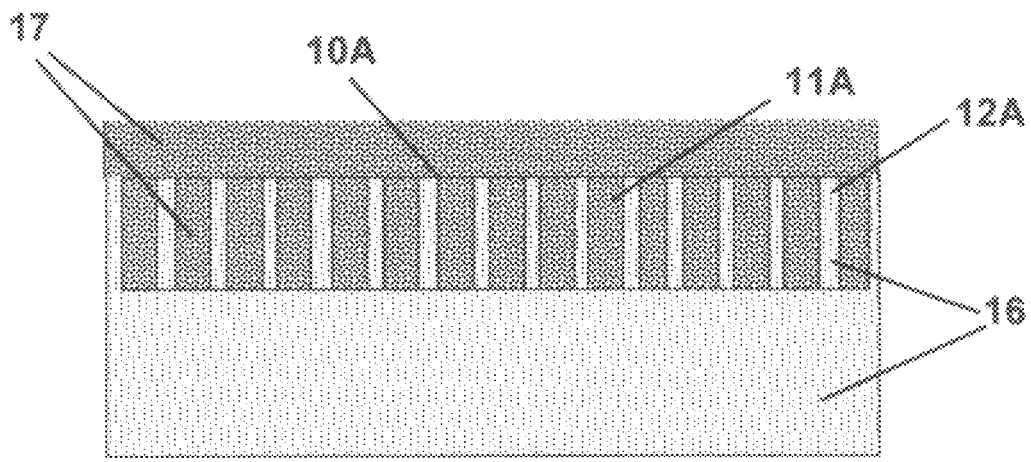
Fig. 5-A
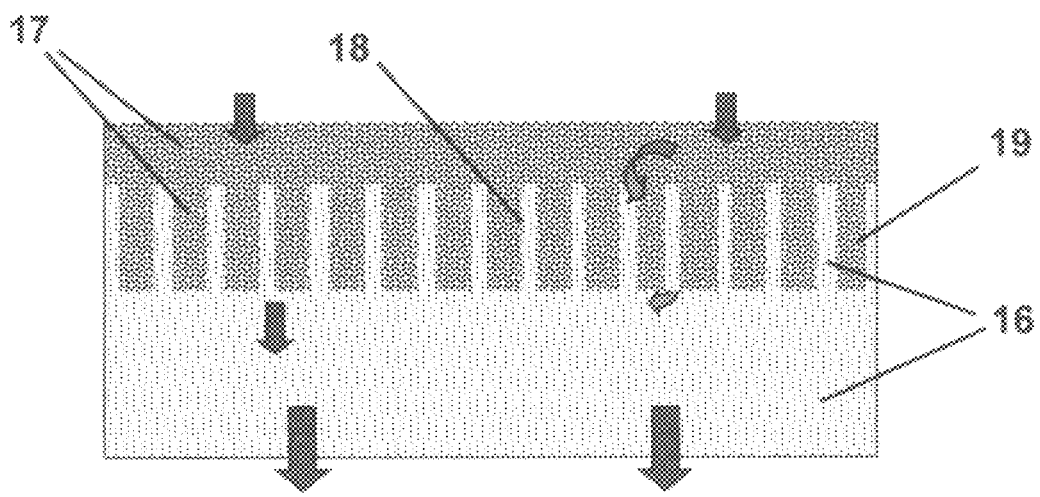
Fig. 5-B

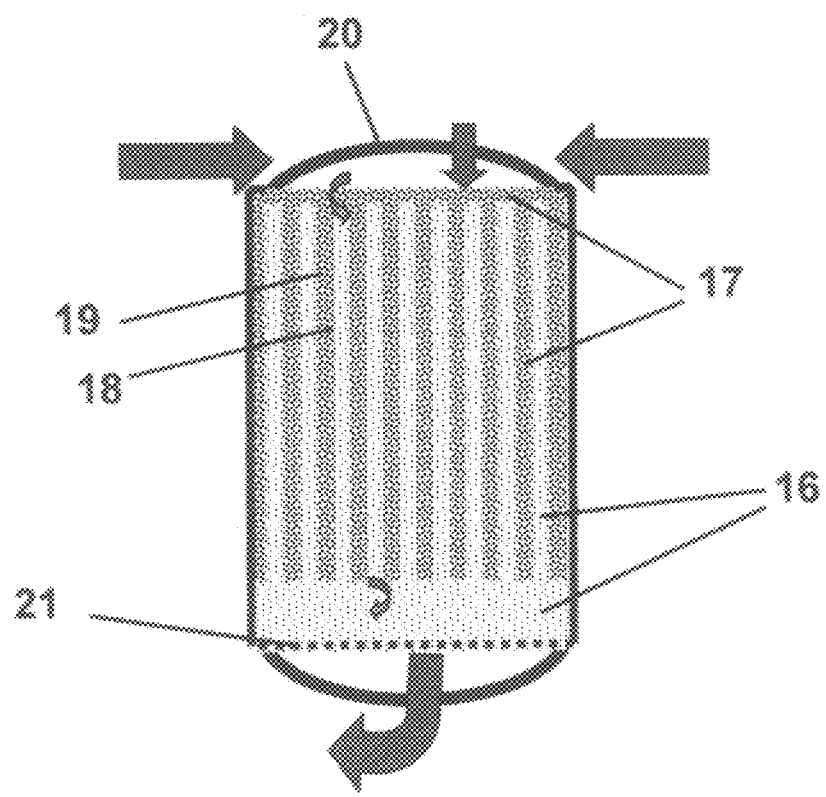
Fig. 6-A

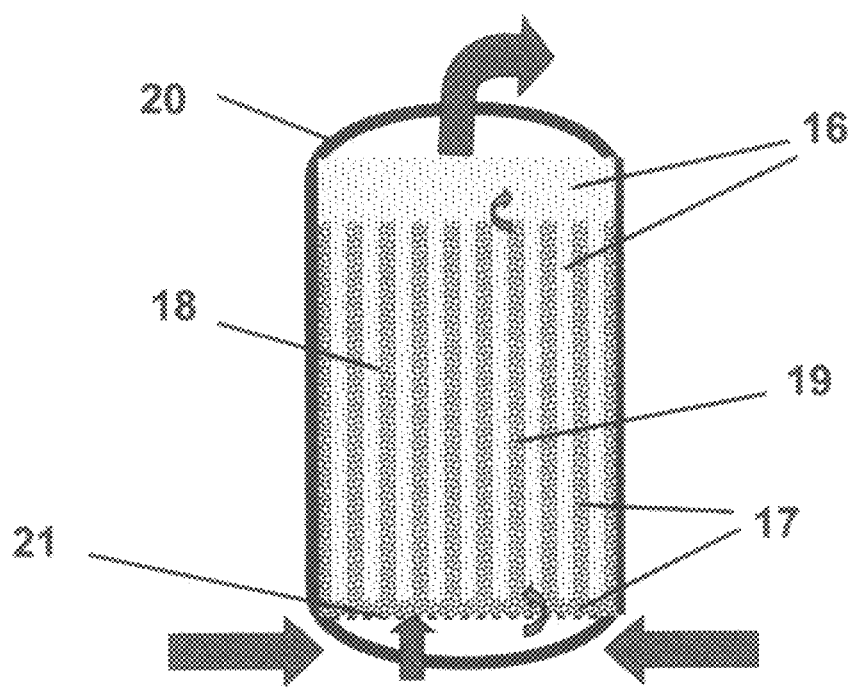
Fig. 6-B

METHOD AND APPARATUS FOR FILTERING STORMWATER

CROSS-REFERENCE TO RELATED APPLICATIONS

This application is a continuation-in-part of CIP application Ser. No. 13/373,566, filed Nov. 19, 2011, now pending.

FEDERALLY SPONSORED RESEARCH

Not Applicable

SEQUENCE LISTING OR PROGRAM

Not Applicable

BACKGROUND

Field of Invention

The present invention relates to the removal of contaminants, particularly particulates, from liquids by filtration.

Prior Art

One of the most significant drawbacks to filtration and infiltration systems used for treating contaminated water is premature clogging of the surface due to buildup of solids. In industrial and drinking water treatment, filters are backwashed periodically to restore hydraulic flow, or other mechanical methods may be used (U.S. Pat. No. 7,163,630). This is not possible in typical stormwater filtration and infiltration devices which operate passively (without power) under gravity filtration. Many stormwater devices are therefore part of systems that incorporate some combination of filter media, hydrodynamic sediment removal, oil and grease removal, or screening to remove floatables and particles that could prematurely blind the filter media. A typical sand filter system includes a pretreatment or sedimentation chamber that prolongs filter media life by removing floatables and heavier suspended solids. Infiltration treatment systems are normally combined with pretreatment such as grass strips or swales, or sediment basins to prevent premature clogging. Dual layer filters in which a coarse grain size media layer is on top of a finer grain size layer is another technique used to prolong the hydraulic life of filters (U.S. Pat. Nos. 7,045,067; 5,281,332; 3,876,546). Ultra-urban filter devices incorporate vertical flows or use relatively coarser media or media in pellet form to prevent premature clogging of the media (U.S. Pat. Nos. 7,419,591; 6,649,048; 5,707,527). In general, the trade off is between using small grain size filter media which improves treatment but results in quicker clogging, and using coarser grain size media which provides poorer treatment but prolongs hydraulic capacity.

In industrial applications, high contact area filter elements are used together with backwashing to prolong the service life of pressurized filtration systems. These elements, called "filter candles", are typically tubular or cylindrical and consist of slotted or perforated material, such as wire mesh or wedge wire, of various slot or opening sizes to suit the application (U.S. Pat. No. 5,474,586). Increasing the filtration contact area using a high contact area device has also been proposed for molten polymer filtration (U.S. Pat. No. 3,044,628). Screen filters have recently been proposed in wastewater and stormwater treatment applications (U.S. Pat. Nos. 3,875,055, 4,235,724; 5,492,635; 6,337,025 B1; 6,533,941). Cartridge type filter devices used to treat environmental flows, including stormwater runoff, can also utilize screens both to filter particulates and as a means of directing flows in and out of the individual cartridges (U.S. Pat. Nos. 6,649,048; 5,024,771).

The prior art shows that clogging of granular media filters is a major concern in terms of service life and maintenance costs. This is particularly true for "passive" or gravity flow filters commonly used for stormwater treatment because backwashing is often impractical. It is an object of this invention to use a specially shaped, high surface area device to improve the service life of granular media filtration and infiltration media used for passing or treating contaminated water such as stormwater runoff. The improved service life is achieved by using the device to create a layer of granular media (a filter layer) that has increased area available to pass the contaminated water flow. Increasing the area available to pass flow reduces the rate of clogging of the filter and therefore improves the service life. It is also an object of this invention to provide some treatment of stormwater runoff by removing pollutants and particles and to promote infiltration by increasing the volume capture of the contaminated water, particularly stormwater runoff.

SUMMARY

Presented is a device and method for prolonging the service life of contaminated water management practices, such as stormwater best management practices, by increasing the area available to pass flow. The increased area for passing the contaminated water flow is created using a specially shaped, high surface area device to increase the area of granular media surface that is exposed to the flow. The primary advantage of this method over the prior art is a substantial increase in the area available for flow that is provided by the device, resulting in a reduced rate of clogging of the media and increase in service life.

DRAWINGS

FIG. 1-A Shows a side view of a configuration of the specially shaped device comprising of prism elements.

FIG. 1-B Shows a plan view of the configuration of the specially shaped device comprising of prism elements.

FIG. 2-A Shows a side view of the preferred configuration of the specially shaped device comprising of hollow elements adjacent to each other.

FIG. 2-B Shows a plan view of the preferred configuration of the specially shaped device comprising of hollow elements adjacent to each other.

FIG. 3-A Shows a side view of a configuration of the specially shaped device comprising of hollow elements attached to support members.

FIG. 3-B Shows a plan view of a configuration of the specially shaped device comprising of hollow elements attached to support members.

FIG. 4 Shows an example of components that can be placed and positioned to form the specially shaped device.

FIG. 5-A Shows use of the specially shaped device comprising of adjacent elements for the creation of the high surface area media in an open bed.

FIG. 5-B Shows use of the high surface area media created by the specially shaped device in an open bed.

FIG. 6-A Shows use of the high surface area media created by the specially shaped device in a cartridge filter operating in downflow mode.

FIG. 6-B Shows use of the high surface area media created by the specially shaped device in a cartridge filter operating in upflow mode.

DETAILED DESCRIPTION

The specially shaped device of this invention comprises of one or more elements such as "candles" (cylindrical, prism, spherical, or other shape), elongated "fins" (rectangular or other cross-section), or any combination of these. The elements of the device are components of the device that comprise of "walls" that provide separation of the media during media addition. Those skilled in the art will understand that the elements of the device can be any of a large variety of shapes and sizes. The elements can be attached to each other or be attached to one or more support members that can be rigid (any material) or flexible (ropes or ties made from nylon or other material). The support members can form a frame that is open so that during installation a media can be introduced into predetermined areas formed by the frame. The term "open" is used here to mean completely or sufficiently open to allow media to be added into areas around the outside of the elements. Typically, the elements are hollow so that media can be added into the elements. Preferably, the device is fabricated in the form of modules, each module comprising of one or more elements. Depending on needs, a plurality of modules can be placed and positioned prior to addition of media.

An alternative to a fabricated device is a one where the device is "formed" from prefabricated components of predetermined size and shape that are placed and positioned together prior to adding the media. The device formed in this way can comprise of unattached components placed together or can comprise of components attached by any means, for example by connecting or interlocking, for increased rigidity. An example is a cylindrical element device formed from two semi cylindrical element components that have been placed and positioned together on top of media. Another example is a device comprising of two components—one component with hollow elements and the second with solid elements that fit into the hollow elements. In this example, a media is added around the elements, the second component with solid elements is removed, and a second media added to the now hollow elements of the first component.

The term "device" is used here to mean both a fabricated device comprising of elements attached to each other or attached to support members, and a "formed" device comprising of components that are placed and positioned in place to create the device. The term "elements" is used here for both elements that are part of the fabricated device and elements that have been "formed" from components that are placed and positioned in place prior to addition of media. The term "hollow" is used here to mean that prior to addition or media the elements are completely or sufficiently hollow to allow media to be added inside the elements.

It will be understood by those skilled in the art that the elements of the device can be configured in any number of different ways. These include, but are not limited to, elements that are attached by support members, elements that are adjacent to each other, elements that are nonconcentric, elements that are concentric, elements that have nonconcentric elements within, or some alternative configuration. A preferred configuration is one where the elements are nonconcentric and are adjacent to each other and the elements themselves provide the "open frame" for the device. In this configuration, media can be introduced into adjacent elements and/or the relatively smaller remaining spaces between the elements. For example, a first media could be added into predetermined elements and a second media into other predetermined elements that are adjacent to elements and/or areas between elements that already have the first media. It will be understood by those skilled in the art that this configuration can enable a relatively denser packing of the elements, and therefore provide a relatively greater area available for flow per unit footprint area of the device than the alternative configuration with frame members. Another alternative configuration is a device with one or more nonconcentric elements where the increased area available for flow (i.e. high surface area) is provided by pouring one media into the elements and another media around the outside of the elements. Another example is a main hollow cylindrical element that has secondary concentric cylindrical elements within. In this configuration, the high surface area is provided by pouring one media between alternate annular spaces and passing the contaminated water flow through the remaining annular spaces that contain a second media. As an alternative to this concentric configuration, a circular form of the device with nonconcentric elements can be used. These configurations are expected to be particularly beneficial in cartridge-type treatment units.

The size of the elements and number of elements per unit area of device will depend on the severity of the clogging problem. Preferably, the width of the elements (or diameter for cylindrical elements) is in the range of about 0.5 to 10 inches, or more preferably in the range about 0.5 to 4 inches. The overall surface or contact area of the elements can vary depending on the application. The overall surface or contact area provided by the elements can vary depending on the application, but is expected to two or more times that of the largest footprint area of the device itself. Preferably, the surface area of an element is in the range about 2 to 20 times the footprint area occupied by the element, or more preferably in the range about 5 to 20 times the footprint area occupied by the element. If the need to prevent premature clogging is more important, than a device with elements of relatively higher surface area can be used, while a device with elements of surface area closer to about two times their footprint area may be preferred for ease of installation. To facilitate easier installation, the device can be modular with sections that can be placed or snapped together, or attached by flexible supports and rolled out over the media.

The device is of sufficient strength and rigidity to allow addition of media, and can be of material that is solid, perforated, or a combination of the two. For example, the elements and frame of the device can be solid material, or the frame can be solid but the elements are of perforated material. An advantage of solid material is increased strength during installation. Another advantage is intermixing of media is avoided during installation since there are no perforations through which media particles can mix. Perforated material is material that is not solid, for example it contains perforations or slots. Use of perforated material can reduce the amount of material required for constructing the device. The elements of the device can also be corrugated for increased strength and rigidity. An example is a device made of corrugated, plastic elements. In applications where traffic rating is required, for example treatment practices that are adjacent to roadways, the device can comprise of a frame structure that can be left in the filter layer to provide the traffic rating required. This frame structure is designed to provide the traffic rating but not restrict flow through the newly created areas between the two media.

The specially shaped device is used with two or more granular media. The term "granular" is used here to mean a media or material that is in a form that can be readily poured or added to areas of the device, for example media in the form of granules, particles, fibers, fines, pellets, chips, powders, flakes, beads, spheres, or filings. The granular media used can be natural media, engineered media, manufactured media, or any combination of these. Further, the granular media can contain internal pores or spaces, for example perlite, activated media, expanded media, particles of filter fabric or sponge media. The first media is typically the media for which the increased area for flow is desired. As well as provide some treatment of the contaminated water, the second media typically occupies predetermined areas of the device such as inside the elements of the device or the spaces around the elements, and prevents the newly created high area surfaces from collapsing when the device is removed. The second media is selected such that clogging occurs at the interface of the two media. Typically, the second media is coarser than the first media, or of different size distribution, composition, or shape that would cause the clogging to occur at the interface of the media. The first and second media can be different based on differences in grain size or grain size distribution, grain shape, media composition, or any combination of these. For example, the first media can be soil and the second media can be relatively coarser bioretention soil (engineered soil). Another example is fine sand as the first media and relatively coarser sand as the second media. Yet another example is a manufactured media such as perlite or expanded shale as the first media and sand as the second media.

It will be understood by those skilled in the art that there are a large number of natural media, manufactured media, and media mixes that could be used as either the first media or the second media. Natural media that can be used include, but are not limited to, sand, gravel, soil, perlite, limestone, dolomite, carbon, alumina, iron oxide, compost, shale, slate, and peat. Manufactured media that can be used include, but are not limited to, media that are "expanded", "activated", or "coated", such as expanded shale, activated carbon, and coated sand, as well as granular media formed from manufactured materials such as nonwoven filter media and sponge media. Engineered media include, but are not limited to, engineered soils created by mixing sand and compost, soil and compost, sand and mulch, or any combination of other media. The media can be added in any order. For instance, the first media is added first to predetermined areas and is followed by the second media in other predetermined areas, or the second media is added first to predetermined areas and is followed by the first media in other predetermined areas.

After addition of media, the media are brought into contact with each other. Typically the device is removed or the elements are removed to bring into contact the media. Alternatively, the components, elements, and/or frame of the device are removed or repositioned to bring the media into contact. The term "bringing into contact" is used here to mean the device or portions of the device are completely or sufficiently removed or repositioned such that the media are brought into contact. Some device components or portions of the device may remain, for example to provide traffic rating to the surface of the media created using this invention.

FIGS. 1-A and 1-B show side and plan views, respectively, of a device configuration comprising of nonconcentric prism elements. In the configuration shown, the device 7 comprises of hollow prism elements 8 formed by support members 9A.

FIGS. 2-A and 2-B show side and plan views, respectively, of a preferred device configuration comprising of elements adjacent to each other. The device 10A shown in FIGS. 2-A and 2-B comprises of hollow elements 11A that are adjacent to each other, with the elements themselves forming the "open frame" 12A. In this configuration, a first media can be added to one group of preselected elements and/or open areas between elements and a second media to adjacent elements and/or open areas.

FIGS. 3-A and 3-B show side and plan views, respectively, of an alternative device configuration comprising of elements attached to support members. The device 10B shown in FIGS. 3-A and 3-B comprises of hollow elements 11B attached to a plurality of support members 9B that form an open frame 12B that allows media to be added around the outside of the elements. In this configuration, a first media can be added to one group of preselected elements and/or open areas between elements and a second media to adjacent elements and/or open areas.

FIG. 4 shows an example of components that can be placed and positioned to form the device used to create the high surface area media. In this configuration, device 13 comprises of hollow elements 14 that are formed when components 15 are positioned or snapped together.

In the preferred embodiment, a modular device made of rigid material is used to increase the media area available to pass flow. Two different media are used in this embodiment. The first media is the media for which the increased area for flow is desired. The two media can be different based on differences in grain size or grain size distribution, grain shape, media composition, or any combination of these that would cause clogging to occur at the interface of the two media. Those skilled in the art will understand that there are a large number of alternative media combinations that could be used. Following addition of the media, the device is removed to bring into contact the two media and increase the area available for flow.

FIG. 5-A shows use of the modular device in the preferred embodiment. In FIG. 5-A, the device 10A comprising of elements attached to each other is placed on top of the first media 16. The first media 16 is added into predetermined areas 12A, for example the open areas between elements. During this stage the openings to the tops of adjacent predetermined areas 11A are typically closed, for example by a cover that is made of rigid material. Closing the tops of predetermined areas 11A allows the rapid and efficient introduction of the first media 16 by preventing the media from entering areas that are for the second media. The second media 17 is then added to predetermined areas 11A, for example the areas for the elements themselves. The first and second media can be added in any order. An alternative is a first media added to predetermined areas 11A followed by a second media to predetermined areas 12A. The term "added to" is used here to mean added into the predetermined areas, where appropriate after removal of any cover or other component present. Although not required to be, the high surface layer can be completely covered by a layer of second media 17 which then acts as a pretreatment media. The layer of second media 17 also prevents access to mosquitoes when standing water is present in the high surface area regions 19 shown in FIG. 5-B. Following installation of the media, the device is removed to bring into contact the first and second media and increase the area available for flow. FIG. 5-B shows use of the high surface area media created by the preferred embodiment after media installation and removal of device 10A. In FIG. 5-B, contaminated water enters the second media 17, and passes into first media 16 at the interface between the media, including the interfaces 18 between the two media in high surface regions 19. It then travels through the bulk of first media 16.

FIG. 6-A shows use of the high surface area media created by a nonconcentric configuration of the device in a cylindrical cartridge-type treatment unit operating in downflow mode. The high surface area shown for first media 16 is created using the process outlined in FIGS. 5-A and 5-B but instead using a circular form of device 10A in FIG. 2. Flows enter the treatment unit 20 near the top. Flows may enter second media 17 before first media 16 if second media 17 completely covers first media 16. The flows pass into first media 16 at the interface between the media, including the interfaces 18 between the two media in high surface area regions 19. Treated flows leave treatment unit 20 through media support 21 or another means such as an underdrain system.

FIG. 6-B shows use of the high surface area media created by a nonconcentric configuration of the device in a cylindrical cartridge-type treatment unit operating in upflow mode. The high surface area shown for first media 16 is created using the process outlined in FIGS. 5-A and 5-B but using a circular form of device 10A in FIG. 2. In this mode, treatment unit 20 is typically turned upside down to facilitate installation of the media and the circular form of device 10A. Flows enter the treatment unit 20 near the bottom, and enter second media 17 through media support 21. Flows may enter both first media 16 and second media 17 when a layer of second media 17 is not used on support 21. Flows pass into first media 16 at the interface between the media, including the interfaces 18 between the two media in high surface area regions 19. Treated flows leave treatment unit 20 near the top. Those skilled in the art will understand that there are a number of alternative flow directions that could be utilized in cartridge-type treatment units. One such configuration comprises flows entering through perforations on the sides of the treatment unit 20 and then flowing to the top or bottom of treatment unit 20 before passing through the high surface area media.

Those skilled in the art will understand that the specially shaped device could be configured in a number of alternative ways and be used in a number of different situations. In one alternative, the hollow elements are filled with media before the areas around the elements are filled. To facilitate efficient installation in this case, the areas around the elements may be covered (e.g., with a rigid cover) during pouring of the media into the elements. Another alternative utilizes a device with the elements adjacent and attached to each other. In this alternative, the elements themselves form an "open frame". In this configuration, a first media could be added into predetermined elements and a second media into the areas between the elements or into other predetermined elements that are adjacent to elements that already have the first media. One preferred configuration is a device that is fabricated in the form of modules, each module comprising of one or more elements. Depending on needs, a plurality of modules can be placed and positioned prior to addition of media. An alternative to a fabricated device is a one where the device is "formed" from prefabricated components of predetermined size and shape that are placed and positioned together prior to adding the media. The device formed in this way can comprise of unattached components placed together or can comprise of components attached by any means, for example by connecting or interlocking, for increased rigidity. Another alternative utilizes flexible support members for the open frame to reduce the required storage space for the device and enable the device to be "rolled out" over the media.

From the description above, a number of advantages of this new invention become evident:

(a) The method involves use of a device that increases the area available for passing contaminated water through a granular media. This reduces the rate of clogging and the need for frequent maintenance, and directly reduces operating costs.

(b) The method involves use of a device that increases the surface or contact area available for filtration or infiltration but is then removed before the contaminated water is passed through the system. The benefit of this application is reduced costs because the device can be reused at a large number of treatment sites. The device can be modular, and therefore easily installed in stormwater treatment practices such as infiltration systems and media filters.

(c) The improved service life provided by the method over traditional media increases flexibility in the design of stormwater practices. Stormwater treatment practices could be made smaller and operated at higher loading rates because the method is less prone to clogging. This is especially beneficial in urban areas, where space for installation of stormwater practices is often constrained.

(d) The high surface area regions created by the invention will increase the volume capture of stormwater since each such region acts as a "micro-infiltration basin" capable of capturing and holding the water. This is particularly beneficial during relatively higher precipitation storm events when runoff would otherwise sheet flow over the stormwater practice. The high surface area regions will also increase plant and microbial activity because of the relatively longer periods of water availability.

Although the description above contains specificities, these are not to be seen as limiting the scope of the invention but as merely providing illustrations of some of the expected common alternatives and embodiments. Thus, the scope of the invention should be determined by the appended claims and their legal equivalents, rather than by the examples given.

The invention claimed is:

1. A method for forming a granular media for treating contaminated stormwater, said granular media comprising of a first media and nonconcentric media elements of a second media, said method comprising: providing a device which comprises of two or more nonconcentric device elements of predetermined size and shape, adding said first media to first predetermined areas of said device, adding said second media to second predetermined areas of said device, said first and second predetermined areas selected so as to provide said nonconcentric media elements on removal of said device, and removing said device to create said nonconcentric media elements and bring about an increase in area available to pass said contaminated stormwater.

2. The method of claim 1, wherein said device elements are hollow prior to addition of said first media and said second media.

3. The method of claim 1, wherein said first media and said second media have different grain size, grain size distribution, grain shape, or composition.

4. The method of claim 1, wherein said first media and said second media are selected from the group consisting of natural media, engineered soil, manufactured media, and combinations thereof.

5. The method of claim 1, wherein shapes of said device elements are selected from the group consisting of cylindrical shapes, prism shapes, and combinations thereof.

6. The method of claim 1, wherein said device is formed of components placed together prior to addition of said first media and said second media.

7. A method for forming a granular media for treating contaminated stormwater, said granular media comprising of a first media and nonconcentric media elements of a second media, said method comprising: providing a device which comprises of two or more hollow nonconcentric device elements of predetermined size and shape and total surface area at least two times the largest footprint area of said device, adding said first media to first predetermined areas of said device, adding said second media to second predetermined areas of said device, said first and second predetermined areas selected so as to provide said nonconcentric media elements on removal of said device, and removing said device to create said nonconcentric media elements and bring about an increase in area available to pass said contaminated stormwater.

8. The method of claim 7, wherein said device elements are adjacent to each other.

9. The method of claim 7, wherein said device is formed of components placed together prior to addition of said first media and said second media.

10. The method of claim 7, wherein said first media and said second media are selected from the group consisting of natural media, engineered soil, manufactured media, and combinations thereof.

11. The method of claim 7, wherein said first media and said second media have different grain size, grain size distribution, grain shape, or composition.

12. The method of claim 7, wherein shapes of said device elements are selected from the group consisting of cylindrical shapes, prism shapes, and combinations thereof.

13. The method of claim 1, wherein said first predetermined areas and said second predetermined areas are adjacent to each other.

14. The method of claim 7, wherein said first predetermined areas and said second predetermined areas are adjacent to each other.

* * * * *